Aug. 19, 1924.
A. E. EARLEY
1,505,875
CULTIVATOR ATTACHMENT
Filed March 1, 1922
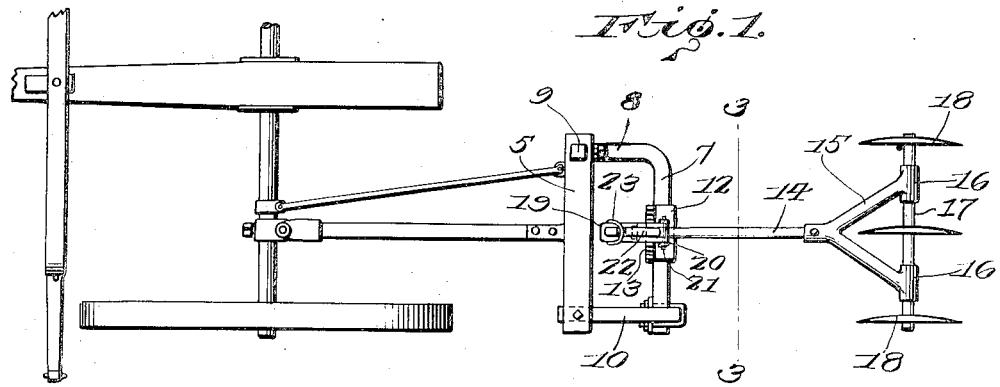
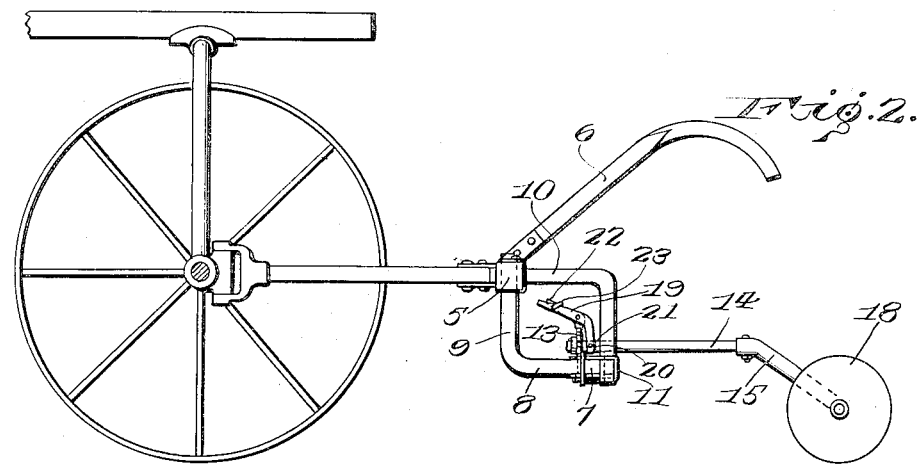
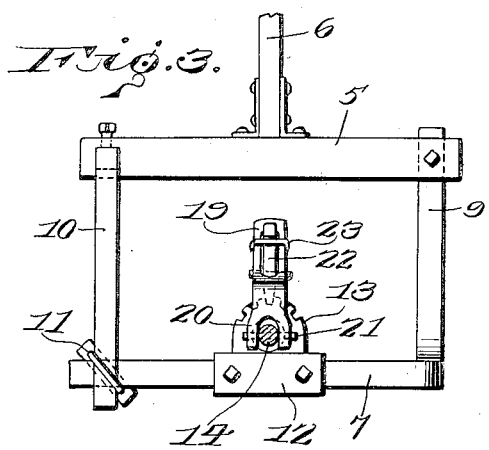
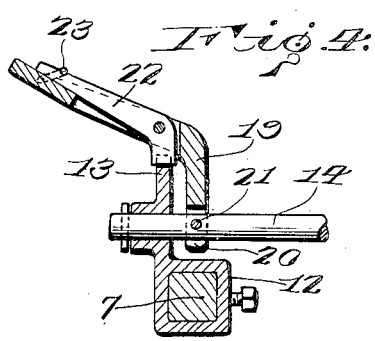
INVENTOR.
Alon E. Earley
BY
ATTORNEYS.

Patented Aug. 19, 1924.

1,505,875

UNITED STATES PATENT OFFICE.

ALON E. EARLEY, OF SEMINOLE, OKLAHOMA.

CULTIVATOR ATTACHMENT.

Application filed March 1, 1922. Serial No. 540,259.

*To all whom it may concern:*

Be it known that I, ALON E. EARLEY, a citizen of the United States, residing at Seminole, in the county of Seminole, State of Oklahoma, have invented certain new and useful Improvements in Cultivator Attachments; and I do hereby declare the following to be a full, clear, and exact description of the invention, such as will enable others skilled in the art to which it appertains to make and use the same.

This invention relates to cultivator attachments, the primary object of the invention being to provide means of a simplified and improved nature for enabling the ordinary well known shovel cultivator to be quickly and easily transformed into a disc cultivator.

A further object of the invention is to provide means of the character stated, wherein the discs which are employed to replace the shovels may be very accurately adjusted so as to properly cut into and turn over the soil without damage or injury to young growing plants, and whereby to avoid tearing up the plants or throwing trash thereon.

A still further object of the invention is to provide a device of the character stated, which is capable of quick and easy adjustment to cultivators now generally in use; which involves the use of but few simple and readily assembled parts, which has its several parts so constructed and arranged as to minimize the opportunity for wear or breakage, which may be manufactured and marketed at low cost, which cannot be readily deranged or rendered inoperative or defective in use, and which will prove thoroughly practical and efficient in use.

With these objects in view, together with others which will appear as the description proceeds, the invention resides in the novel construction, combination and arrangement of parts, all as will be more fully described, hereinafter, illustrated in the drawing, and particularly pointed out in the claims.

In the drawing:

Figure 1 is a top plan view of a portion of a conventional type of shovel cultivator, and illustrating as applied thereto a disc attachment embodying my invention.

Figure 2 is a side elevation, parts broken away, of the device shown in Figure 1.

Figure 3 is a sectional view taken substantially upon line 3—3 of Figure 1, and

Figure 4 is a detailed view showing the means of connecting the disc beam with the supporting or auxiliary beam.

Referring now more particularly to the drawing, the shovel bar of the well known walking cultivator is indicated at 5, and the handle for adjusting this bar is shown at 6. In carrying out the invention I propose to dispense with the shovels usually carried by the bar 5 of the cultivator, and to utilize this shovel bar as a means of support for the discs, which I propose to use with the cultivator. To this end, I resort to the use of a supporting or supplementary beam indicated at 7, the said beam being maintained parallel to the bar 5, in the rear thereof and slightly below the level of the said shovel bar. This supporting beam 7 is provided at one end with an offset leg 8, from the outer end of which extends upwardly or at right angles thereto an arm 9, of such size as to engage within one of the shovel standard openings in shovel bar 5. Any suitable clamping means may be employed to maintain the arm 9 rigidly secured in the opening in shovel bar 5. The free end of the supporting beam 7 is attached to the rear end of a reenforcing beam 10, the latter being secured at one end in any suitable manner to shovel bar 5, and being coupled at its rear end with the adjacent extremity of the supporting beam 7, as by the U bolt clamp 11. When attached to the shovel bar in this manner, it is apparent that the supporting beam 7 will be rigidly held with the shovel bar and will be disposed parallel thereto, and in a plane slightly lower and in the rear of said shovel bar. The parts 7 and 10 are preferably constructed of metal of suitable size to withstand strains and weights to which they must necessarily be subjected, and the supporting beam 7, at least, is preferably rectangular in cross section.

The supporting beam 7 carries a sleeve 12, the latter being, if desired, slidable longitudinally upon said beam and capable of being rigidly held thereto. This sleeve, it will be observed, corresponds to the shape and size of the said supporting beam, and is provided with an upstanding sector 13, disposed longitudinally of the sleeve and having concentric therewith an opening for receiving the forward end of the disc draft beam 14. The draft beam may be coupled to the sleeve in any desired manner, and is capable of rotating therein. The rear end of this draft beam is divided and provides a fork 15, the rear ends of the arms thereof providing bearings 16 to support the disc bar 17. The disc bar carries the cultivator discs indicated at 18, and any desired number of said discs may be employed.

The disc beam 14 is adapted to be rotated in the supporting sleeve 12, so that the pitch or angularity of the discs 18 may be controlled, and to create this adjustment and to maintain the pitch of the discs an adjusting arm 19 is provided. This arm is provided at its rear end with a yoke 20, to embrace the disc beam near its forward end, and a locking pin 21 passes through the yoke of arm 19 and through the disc beam, so as to couple these parts firmly together. The arm 19 extends upwardly and forwardly and overlies the sector 13, and carries a latch 22 to engage in the teeth of the sector. This latch is maintained in locking position by means of the loop 23, carried by the forward end of the arm 19.

In the present instance I have described the invention as used upon one side only of the ordinary shovel cultivator, but it will be understood that a structure such as above set forth may be applied to each of the shovel supporting bars of the agriculture implement. In instances where but a single shovel bar cultivator is used, the supplementary supporting beam 7 will be of a length corresponding to the length of the shovel bar and the length of the disc bar 17 will be correspondingly increased. In such instances, of course, a greater number of discs will be mounted upon the bar 17. It will be understood, however, that greater or less number of discs may be used in connection with the cultivator of the type herein illustrated and referred to.

With the discs applied to the cultivator in the manner above set forth, it is apparent that the ground upon the opposite sides of the row of growing plants may be cultivated properly and thoroughly without danger of injury to the growing plants, and without becoming clogged with trash, as is the case with the ordinary shovel cultivator. The elevation and degree of insertion of the discs into the ground, will, of course, be governed by the operator of the cultivator who follows the cultivator with his hands upon the control bars or handles 6.

The pitch of the disc carrying bar 17 may be accurately adjusted by rotating the disc beam 14 in its supporting sleeve 12, and such adjustment will be maintained by engagement of the latch 22 engaging with the teeth of the sector 13.

From the foregoing it is apparent that I have provided a cultivator attachment of extremely simple construction, and by the use of which the ordinary shovel cultivator may quickly be converted into a disc implement. The several parts are of such simple construction, assemblage and adjustment that no experience or special knowledge or skill is necessary in applying or adjusting the device.

While the foregoing is a description of the invention in its preferred embodiment, it will be understood that variations in the construction, operation and assemblage of the several parts may be liberally resorted to without departing from the invention as defined by the claims.

What is claimed is:

1. In a cultivator attachment, the combination with the shovel bar, of a supporting beam maintained by and spaced parallel from said shovel bar, a sleeve carried by said supporting beam, a sector on said sleeve having a central aperture, a disc beam engaged and maintained in said aperture, an arm rigidly secured to said disc beam and overlying the sector, a latch carried by said arm and engaged with the teeth of said sector, and a disc bar carried by said disc beam.

2. In a cultivator attachment, the combination with the shovel bar having the usual openings for insertion of the shovel beams, of a supporting beam, an arm at one end of said supporting beam engageable in one of the openings of said shovel bar, a beam at the other end of said supporting beam attached to the latter and engageable in another of said shovel bar openings, a sleeve rigidly carried by said supporting beam, a sector disposed longitudinally of said sleeve and having an opening therein, a disc beam having its forward end rotatably engaged in said sector opening, an arm rigidly connected to said disc beam and overlying said sector, a latch carried by said arm and engaged with the teeth of said sector, a yoke at the rear end of said disc beam, and a disc bar carried by the arms of said yoke.

In testimony whereof, I affix my signature in the presence of two witnesses.

ALON E. EARLEY.

Witnesses:
   Thos. O. Criswell,
   Harry Jones.